Sept. 22, 1953      G. A. GERARD      2,652,878
METHOD OF MAKING SHOCK ABSORBING AND INSULATION MATERIAL
Filed Nov. 30, 1951
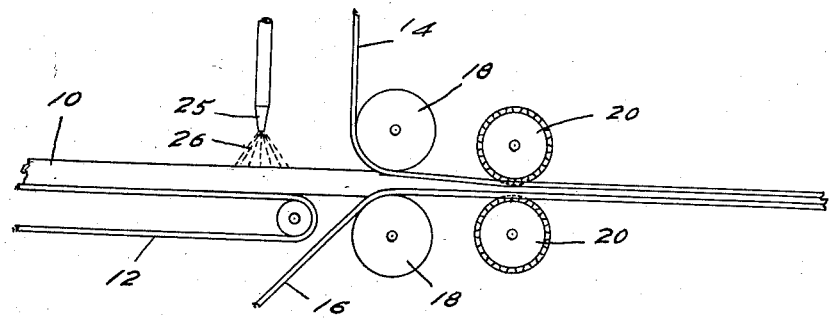
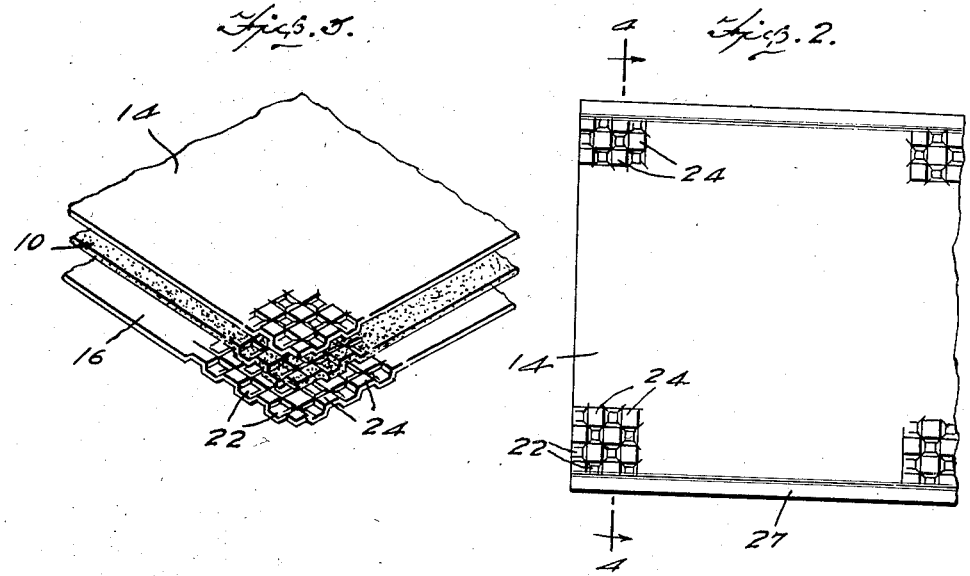
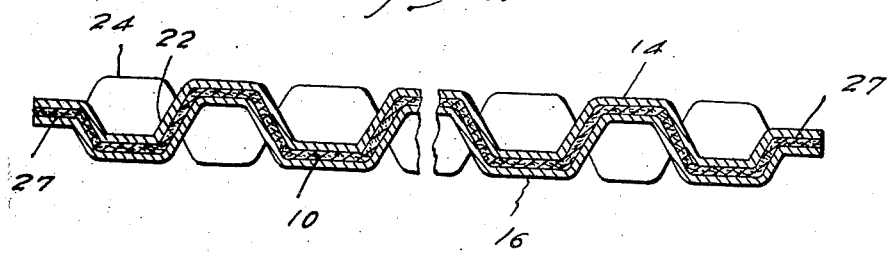
INVENTOR.
George A. Gerard
BY
Wilfred Lawson
ATTY Patented Sept. 22, 1953

2,652,878

UNITED STATES PATENT OFFICE 2,652,878

METHOD OF MAKING SHOCK ABSORBING AND INSULATION MATERIAL

George A. Gerard, Roselle, N. J., assignor to Cottonwood Products, Incorporated, Baltimore, Md., a corporation of Maryland Application November 30, 1951, Serial No. 259,042

1 Claim. (Cl. 154—28)

This invention relates generally to laminated sheet material and is directed particularly to an improved packing and insulation material and method of making the same.

A principal object of the present invention is to provide an improved laminated sheet material designed for use as a shock absorbent in packing or as an insulation material, wherein the laminations of the material are joined together under pressure between embossing rolls whereby desired locking together of the laminations is effected and at the same time the material is given a cellular form which makes it highly resilient and shock absorbent.

Another object of the invention is to provide a laminated sheet material designed for use as a shock absorbing wrapping or packing material, or for use as a heat and cold insulating material, wherein an intermediate layer or lamination of the sheet is comprised of reclaimed newspaper or other paper print which is located between and bonded to top and bottom cover sheets in a novel manner.

A further and more specific object of the invention is to provide a new laminated sheet material of the character stated, wherein use of newspaper or other paper print is employed in comminuted form and wherein a novel method is employed for causing softening and adherence of the laminations of the sheet by the employment of a solvent to act upon the ink in the comminuted paper to give to the sheet a homogeneous character.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a diagrammatic view illustrating the manner in which the laminations of material are brought together for the formation of the finished embossed sheet, showing the spraying of the comminuted newspaper or other reclaimed print paper with an ink solvent prior to bringing the sheets together.

Figure 2 is a view in plan of a portion of a completed sheet showing the embossing thereof and the joining together of the edges of the laminations to maintain the sheets intact.

Figure 3 is a perspective view of a portion of a completed sheet showing the laminations separated to illustrate the manner in which the embossing penetrates all of the sheets.

Figure 4 is a sectional view, on an enlarged scale, taken substantially on the line 4—4 of Figure 2.

Referring now more particularly to the drawing, the invention broadly comprises the bringing together of a web or sheet of comminuted or macerated newspaper or other reclaimed paper, printed or otherwise, and top and bottom covering sheets of ordinary paper of any desired character such as kraft paper or the like.

Referring to Figure 1 the numeral 10 generally designates the web of macerated paper print which is fed in a suitable manner as, for example, on a conveyor 12, between top and bottom sheets 14 and 16 respectively of ordinary paper of suitable weight. The cover sheets 14 and 16 are shown as being fed together between guiding rolls 18 and the macerated intermediate layer 10 is fed in between the cover sheets as shown and the superimposed laminations are then passed between a pair of notched embossing rolls 20 which operate under high pressure to compress the laminations and impart to the completed sheet of material, in both faces, the depressions 22. As will be readily apparent, since the embossing rolls have intermeshing elements around their surfaces which impart the depressions 22 to both faces of the sheet made up of the superimposed laminations, both faces of the sheet will show alternating depressions and mounds 22 and 24 respectively, the depressions of one face of the sheet forming the mounds on the opposite face of the sheet. Thus, as shown in Figure 4 the sheet will have a cellular construction which will make it highly resistent to crushing forces and make it highly absorbent of shocks.

In carrying out the method of preparing the sheet material, a spray jet 25 is located above the macerated paper web 10 at a location just in advance of the entrance of the web between the top and bottom cover sheets 14 and 16 and from this jet is discharged onto the macerated newspaper web, a printing ink solvent in the form of a spray 26 which softens the ink in the paper mass and thus causes the product to become more homogeneous as the web is pressed between the cover sheets.

The solvent may be carbon tetrachloride or any other suitable solvent material such as benzene or the like.

As the laminated sheet material passes from the embossing rolls 20 the longitudinal edges of the sheets may be secured together by suitable pressing means, not shown, and caused to adhere by previously applied adhesive to form the edge band 27. In this manner the laminations will be secured so as to prevent separation and the band or ribbon of sheet material may be cut transversely at desired intervals to form packing material, insulation or for other uses.

While in Figure 4 the inserted macerated paper lamination has been shown as secured at the edges of the sheet between the cover sheets, the web 10 may be made of less width than the cover sheets so that the cover sheets only need be glued together, if desired.

I claim:

The method of forming a shock absorbing, insulation material which comprises feeding a web of macerated reclaimed newsprint between top and bottom sheets of paper stock, wetting the web with a volatile printing ink solvent prior to its passage between said sheets, feeding such superimposed layers of material between compressing and embossing rollers to produce a laminated sheet having opposite surfaces defined by alternate elevated and depressed areas, and sealing the opposite edges of said sheets together.

GEORGE A. GERARD.

References Cited in the file of this patent

UNITED STATES PATENTS

| Number | Name | Date |
|---|---|---|
| 1,781,797 | Williams | Nov. 18, 1930 |
| 1,965,265 | Spohn | July 3, 1934 |
| 2,004,657 | Gerard | June 11, 1935 |
| 2,173,797 | Toohey et al. | Sept. 19, 1939 |
| 2,481,046 | Scurlock | Sept. 6, 1949 |